United States Patent
Lee

(10) Patent No.: US 6,942,374 B2
(45) Date of Patent: Sep. 13, 2005

(54) BACKLIGHT ASSEMBLY AND LIQUID CRYSTAL DISPLAY APPARATUS HAVING THE SAME

(75) Inventor: Kyoung-Don Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/425,336

(22) Filed: Apr. 29, 2003

(65) Prior Publication Data

US 2004/0109306 A1 Jun. 10, 2004

(30) Foreign Application Priority Data

Dec. 5, 2002 (KR) .............................. 10-2002-0077066

(51) Int. Cl.[7] .............................................. F21V 7/04
(52) U.S. Cl. ...................... 362/615; 362/617; 362/561; 362/606
(58) Field of Search ......................... 362/31, 27, 26, 362/606, 615, 617, 561, 560, 330; 349/61–65; 385/146, 50

(56) References Cited

U.S. PATENT DOCUMENTS

| | | | |
|---|---|---|---|
| 5,410,454 A | * | 4/1995 | Murase et al. ................ 362/31 |
| 6,443,583 B1 | * | 9/2002 | Ha ................................ 362/31 |
| 2002/0007576 A1 | * | 1/2002 | Gai .............................. 362/27 |

* cited by examiner

Primary Examiner—John Anthony Ward
Assistant Examiner—Bao Q. Truong
(74) Attorney, Agent, or Firm—Cantor Colburn LLP

(57) ABSTRACT

In an LCD apparatus having a backlight assembly, a light guide plate includes an incident surface for receiving light, a reflecting surface for reflecting the light and an emitting surface for emitting the light. A linear distance between the reflecting and emitting surfaces is smaller than a height of the incident surface. An optical sheet is positioned at the emitting surface having a height lower than the height of the incident surface. Accordingly, although the height of the incident surface increases, the linear distance between the reflecting and emitting surfaces does not increase. Therefore, the light guide plate can obtain an area of the incident surface appropriate to efficiently receive the light, thereby improving a light efficiency of the backlight assembly and preventing an increase in a thickness of the backlight assembly.

31 Claims, 7 Drawing Sheets

BACKLIGHT ASSEMBLY AND LIQUID CRYSTAL DISPLAY APPARATUS HAVING THE SAME

CROSS-REFERENCE TO RELATED APPLICATION

This application relies for priority upon Korean Patent Application No. 2002-77066 filed on Dec. 5, 2002, the contents of which are herein incorporated by reference in its entirety.

BACKGROUND OF THE INVENTION

1. Field of the Invention

The present invention relates to a backlight assembly and an LCD (Liquid Crystal Display) apparatus, and more particularly to a backlight assembly for reducing a whole size thereof and improving a light efficiency and an LCD apparatus having the same.

2. Description of the Related Art

In general, an LCD apparatus includes a backlight assembly for generating light and an LCD panel for displaying an image in response to the light provided from the backlight assembly.

However, a backlight assembly has a higher power consumption and an LCD apparatus has an increased weight and an enlarged size due to the backlight assembly.

Recently, a point light source, for example such as a light-emitting diode, is used as a lamp in a backlight assembly. The light-emitting diode has a lower power consumption and a size suitable for applying to the backlight assembly. However, since the light-emitting diode cannot irradiate light to a long distant place, a light-emitting diode is mainly applied to a mobile LCD apparatus for medium and small size products having a small display screen.

FIG. 1 is a cross-sectional view showing a backlight assembly of a conventional LCD apparatus.

Referring to FIG. 1, a backlight assembly 50 includes a light source 10 for generating light and a light guide plate 20 for guiding the light and emitting the light in a predetermined direction.

The light guide plate 20 includes an incident surface 21 for receiving the light emitted from the light source 10, a reflecting surface 22 for reflecting the light incident through the incident surface 21, that is extended from a first end of the incident surface 21, and an emitting surface 23 for emitting the light incident through the incident surface 21, that is extended from a second end of the incident surface 21 and parallel to the reflecting surface 22.

As shown in FIG. 1, since the reflecting surface 22 and the emitting surface 23 are parallel to each other, a height "h" of the incident surface 21 is same to a linear distance "d" line between the reflecting surface 22 and the emitting surface 23.

The backlight assembly 50 further includes a plurality of optical sheets 30 disposed on the emitting surface 23 and a reflecting plate 40 disposed under the reflecting surface 22.

The height "h" of the incident surface 21 of the light guide plate 20 depends upon the light source 10. That is, the height "h" of the incident surface 21 increases according as a size of the light source 10 increases, so that the linear distance "d" between the reflecting surface 22 and the emitting surface 23 increases. Thus, an entire thickness "t" of the backlight assembly 50 increases.

However, when a thickness of the light guide plate 20 decreases in order to reduce the entire thickness "t" of the backlight assembly 50, the height "h" of the incident surface 21 decreases with the reduction of the entire thickness "t" of the backlight assembly 50. As a result, a light efficiency of the backlight assembly 50 may be deteriorated.

BRIEF SUMMARY OF THE INVENTION

The present invention provides a backlight assembly for reducing a whole size thereof and improving a light efficiency thereof.

Also, the present invention provides an LCD apparatus having the above backlight assembly.

In one aspect of the invention, a backlight assembly includes a light source for generating light and a light guide plate for guiding the light emitted from the light source.

The light guide plate includes an incident surface having a first height, a reflecting surface extended from a first end of the incident surface and an emitting surface facing the reflecting surface and separated from the reflecting surface by a second height smaller than the first height. The incident surface receives the light, the reflecting surface reflects the light incident through the incident surface to the emitting surface and the emitting surface emits the incident light and the reflected light.

In another aspect of the invention, an LCD apparatus includes a light source for generating light, a light guide plate for guiding the light emitted from the light source and an LCD panel for displaying an image.

The light guide plate includes an incident surface having a first height, a reflecting surface extended from a first end of the incident surface and an emitting surface facing to the reflecting surface and separated from the reflecting surface by a second height lower than the first height. The incident surface receives the light, the reflecting surface reflects the light incident through the incident surface to the emitting surface and the emitting surface emits the incident light and the reflected light.

The LCD panel having a display area for displaying an image in response to the light emitted from the light guide plate and a peripheral area disposed adjacent to the display area.

According to the present invention, a linear distance between the reflecting surface and the emitting surface is smaller than a height of the incident surface. That is, an optical sheet is positioned at the emitting surface having a height lower than the height of the incident surface. Accordingly, although the height of the incident surface increases in association with a variation of size of the light source, the linear distance between the reflecting surface and the emitting surface does not need to increase. Therefore, the light guide plate can obtain an area of the incident surface appropriate to efficiently receive the light emitted from the light source, thereby improving a light efficiency of the backlight assembly and preventing an increase in a thickness of the backlight assembly.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
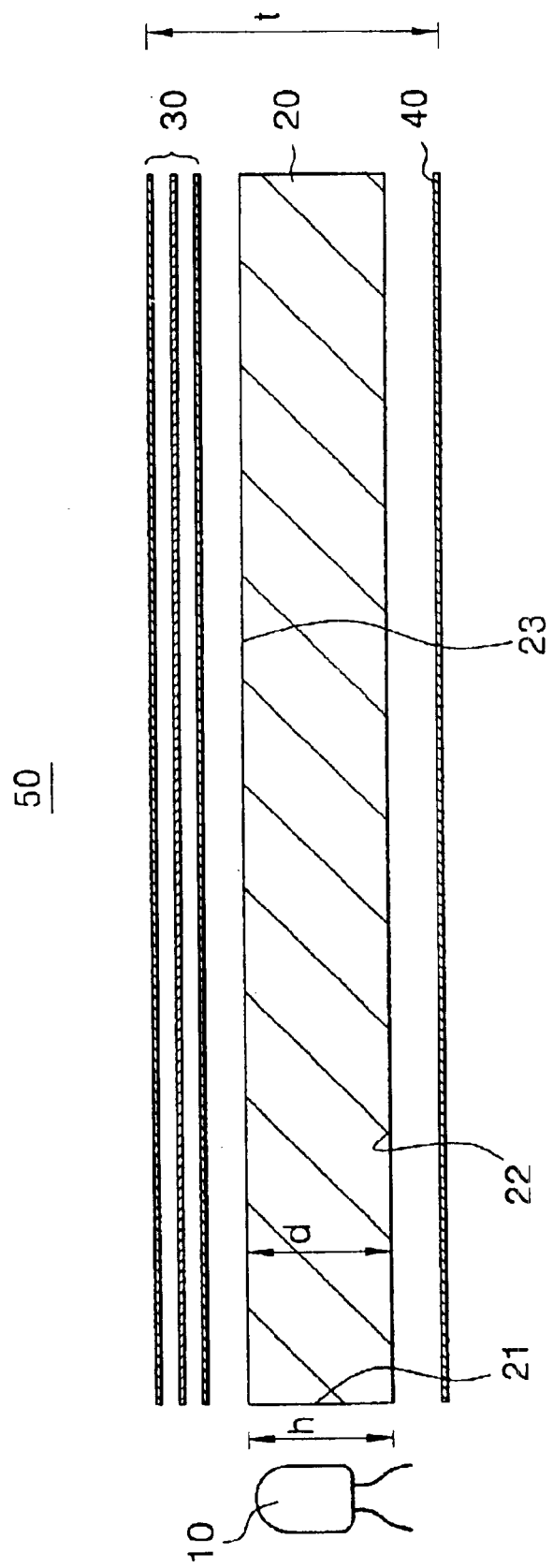
FIG. 1 is a cross-sectional view showing a backlight assembly of a conventional LCD apparatus.
Figure 2:
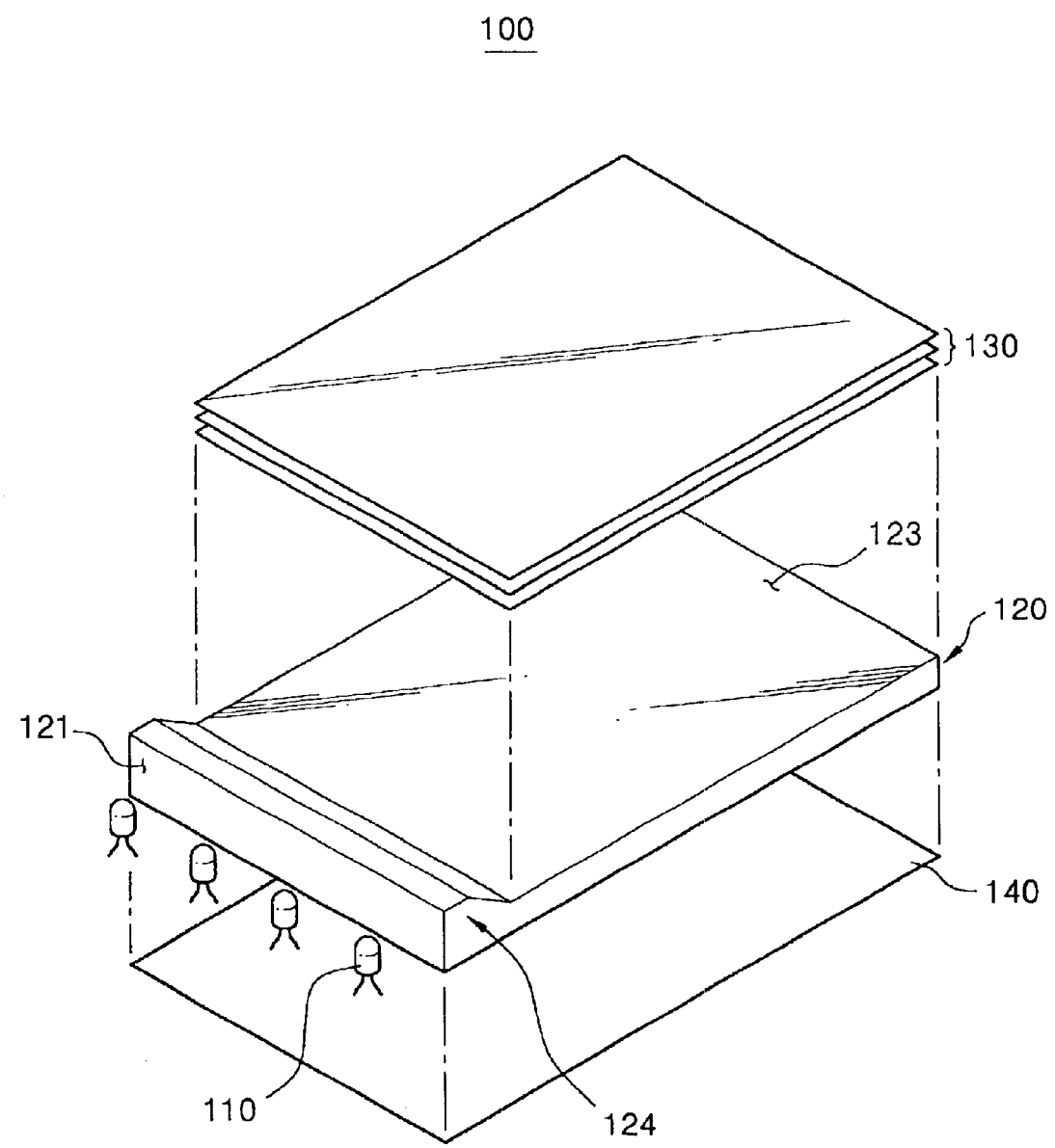
FIG. 2 is a perspective view showing a backlight assembly according to an exemplary embodiment of the present invention.
Figure 3:
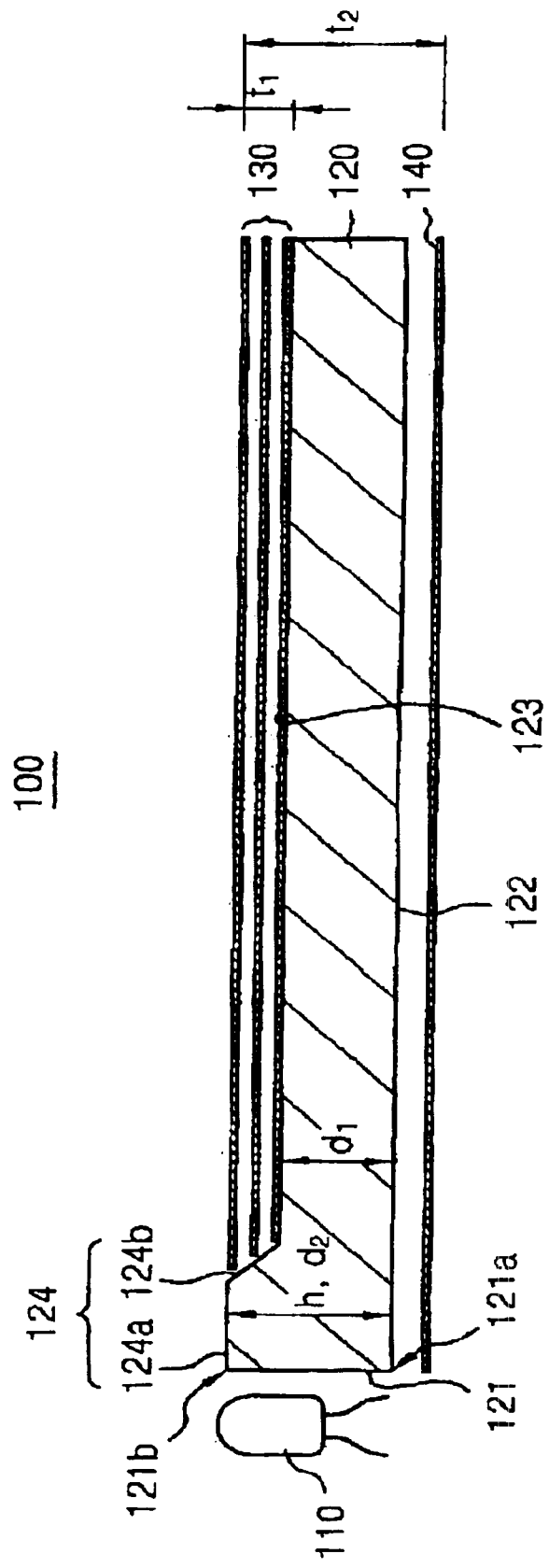
FIG. 3 is a cross-sectional view showing the backlight assembly shown in FIG. 1.

FIG. 2 is a perspective view showing a backlight assembly according to an exemplary embodiment of the present invention and FIG. 3 is a cross-sectional view showing the backlight assembly shown in FIG. 1.

Referring to FIGS. 2 and 3, a backlight assembly 100 includes a light source 110 for generating light and a light guide plate 120 for guiding the light so as to emit the light in a predetermined direction.

Particularly, the light source 110 has a point light source, for example, such as a plurality of light-emitting diodes and generates the light. Each of light-emitting diodes respectively emits the light with recombination of minority carriers, for example, such as electrons or holes injected by using a PN-junction structure of a semiconductor device.

The light guide plate 120 includes an incident surface 121 that receives the light emitted from the light source 110 and is disposed adjacent to the light source 110, a reflecting surface 122 that reflects the light incident through the incident surface 121 and extends from a first end 121a of the incident surface 121 and an emitting surface 123 that emits the light incident through the incident surface 121 and faces the reflecting surface 122.

The incident surface 121 has a height "h" greater than a height of the emitting surface 123 parallel to the reflecting surface 122, that is, a first linear distance d1 between the reflecting surface 122 and the emitting surface 123. The height "h" of the incident surface 121 depends upon a size of the light source 110. That is, the height "h" of the incident surface 121 increases according as the size of the light source 110 increases.

The light guide plate 120 further includes a guide portion 124 that guides the light incident through the incident surface 121 to the emitting surface 123. Particularly, the guide portion 124 includes a first surface 124a extended form an upper end, that is, a second end 121b of the incident surface 121 and a second surface 124b extended from the first surface 124a. The first surface 124a is parallel to the reflecting surface 122 and the second surface 124b connects the first surface 124a to the emitting surface 123.

A second linear distance d2 between the reflecting surface 122 and the first surface 124a is greater than the first linear distance d1 between the reflecting surface 122 and the emitting surface 123 and is equal to the height "h" of the incident surface 121. The second surface 124b is inclined from the first surface 124a toward the emitting surface 123 in a predetermined angle α.

A plurality of optical sheets 130 is disposed on the emitting surface 123 so as to improving optical properties, for example, such as brightness uniformity, visual angle, etc., of the light emitted from the emitting surface 123. The plurality of optical sheets 130 has a size corresponding to that of the emitting surface 123, so that the plurality of optical sheets 130 is disposed on the only emitting surface 123.

An entire first thickness t1 of the plurality of optical sheets 130 is equal to or smaller than a height that subtracts the first linear distance d1 from the second linear distance d2. That is, the first thickness t1 is equal to or smaller than a third linear distance d3 (see FIG. 5) between the reflecting surface 123 and the first surface 124a. Thus, although the plurality of optical sheets 130 is disposed on the emitting surface 123, an entire thickness, that is, a second thickness t2 of the backlight assembly 100 does not increase by the first thickness t1 of the plurality of optical sheets 130.

A reflecting plate 140 that has a size corresponding to that of the reflecting surface 122, is disposed under the reflecting surface 122. The reflecting plate 140 reflects the light leaked from the reflecting surface 122 toward the light guide plate 120 so as to improving a light efficiency of the backlight assembly 100.

In FIGS. 2 and 3, the backlight assembly 100 that employs the point light source such as the plurality of light-emitting diodes as the light source 110 has been described. However, the backlight assembly 100 may employ a linear lamp, for example, such as a cold cathode fluorescent lamp (CCFL) as the light source 110.

Figure 4:
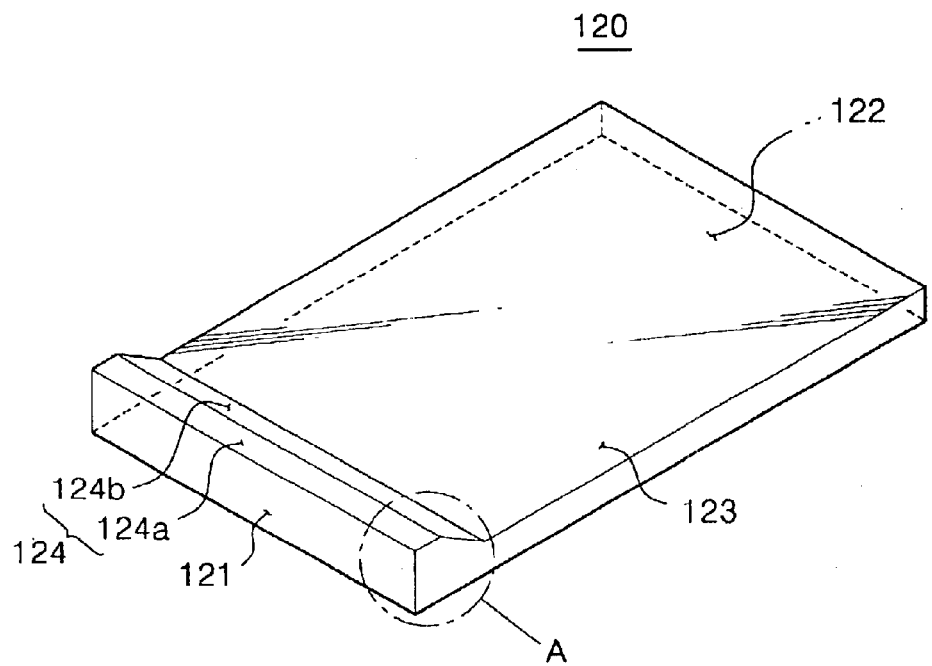
FIG. 4 is a perspective view showing a light guide plate shown in FIG. 2 in detail.
Figure 5:
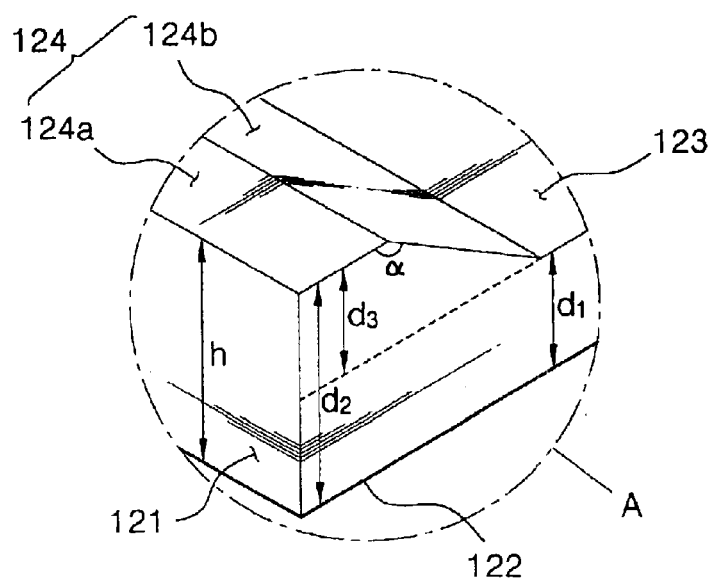
FIG. 5 is a partially enlarged view showing a portion "A" shown in FIG. 4.

FIG. 4 is a perspective view showing the light guide plate 120 shown in FIG. 2 in detail. FIG. 5 is a partially enlarged view showing a portion "A" shown in FIG. 4.

Referring to FIGS. 4 and 5, the light guide plate 120 includes the incident surface 121 that receives the light emitted from the light source 110 and has the height "h", the reflecting surface 122 that extends from the first end 121a (see FIG. 2) of the incident surface 121 and the emitting surface 123 that faces the reflecting surface 122. The emitting surface 123 is spaced apart from the reflecting surface 122 by the first linear distance d1 smaller than the height "h".

Also, the light guide plate 120 further includes a guide portion 124 that guides the light incident through the incident surface 121 to the emitting surface 123. The guide portion 124 includes the first and the second surfaces 124a and 124b. The first surface 124a is extended from the second end 121b (see FIG. 2) of the incident surface 121 and is spaced apart from the reflecting surface 122 by the second linear distance d2. The second surface 124b is extended from the first surface 124a and inclined to the emitting surface 123 so as to connect the first surface 124a to the emitting surface 123. As shown in FIG. 5, the second linear distance d2 is greater than the first distance d1.

The first surface 124a is positioned at a place having a same height as the height "h" of the incident surface 121 so as to allow the light emitted from the light source 110 to be sufficiently incident through the incident surface 121. The first surface 124a reflects or refracts the light incident through the incident surface 121 in order to guide the light to the emitting surface 123.

According to the structure of the first and second surfaces 124a and 124b, the first surface 124a can prevent the formation of a pitch at a corner that the second end 121b of the incident surface 121 and the second surface 124b meet with each other, which is formed when the second surface 124b is directly connected to the second end 121b (see FIG. 2) of the incident surface 121 without the first surface 124a.

Therefore, the backlight assembly 100 can prevent the scratch of the optical sheets 130 disposed on the light guide plate 120 and the damage of parts disposed adjacent to the light guide plate 120.

The second surface 124b is extended from the first surface 124a and inclined to the emitting surface 123 so as to connect the first surface 124a to the emitting surface 123. Particularly, an interior angle α between the first surface 124a and the second surface 124b is equal to or larger than 90 degrees and smaller than 180 degrees. In case that the interior angle α is 90 degrees, the second surface 124b is parallel to the incident surface 121 and perpendicular to the first surface 124a and the emitting surface 123.

In case that the interior angle α is larger than 90 degrees, the second surface 124b is inclined with respect to the incident surface 121, thereby increasing reflectance of the light incident through the incident surface 121. Also, the second surface 124b controls a reflection angle of the light such that the light incident through the incident surface 121 is guided to the emitting surface 123, thereby improving the light efficiency of the backlight assembly 100.

Although not shown in FIGS. 4 and 5, a corner that the first surface 124a and the second surface 124b meet with each other may be formed to have a rounding shape so as to prevent the light guide plate 120, the optical sheets 130 and the parts from being damaged.

In FIGS. 2 to 5, a flat type light guide plate having a structure that the reflecting surface 122 and the emitting surface 123 are parallel to each other has been described as an exemplary embodiment of the present invention. However, the structure of the guide portion 124 may be applied to a wedge type light guide plate (not shown) that the first linear distance d1 between the reflecting surface 122 and the emitting surface 123 is shortened according as the reflecting and emitting surfaces 122 and 123 are separated apart from the light source 110.

Figure 6:
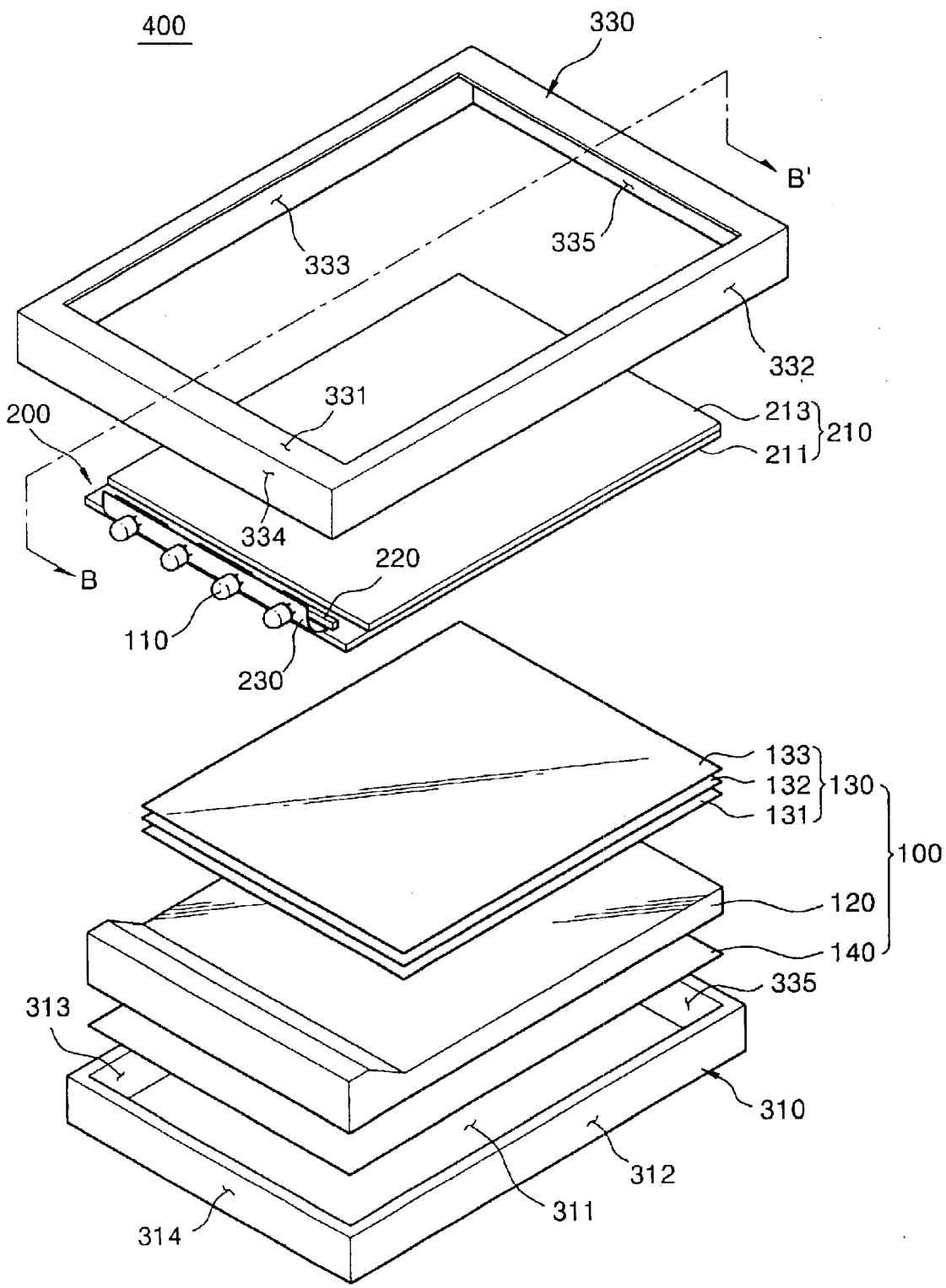
FIG. 6 is an exploded perspective view showing an LCD apparatus according to an exemplary embodiment of the present invention.
Figure 7:
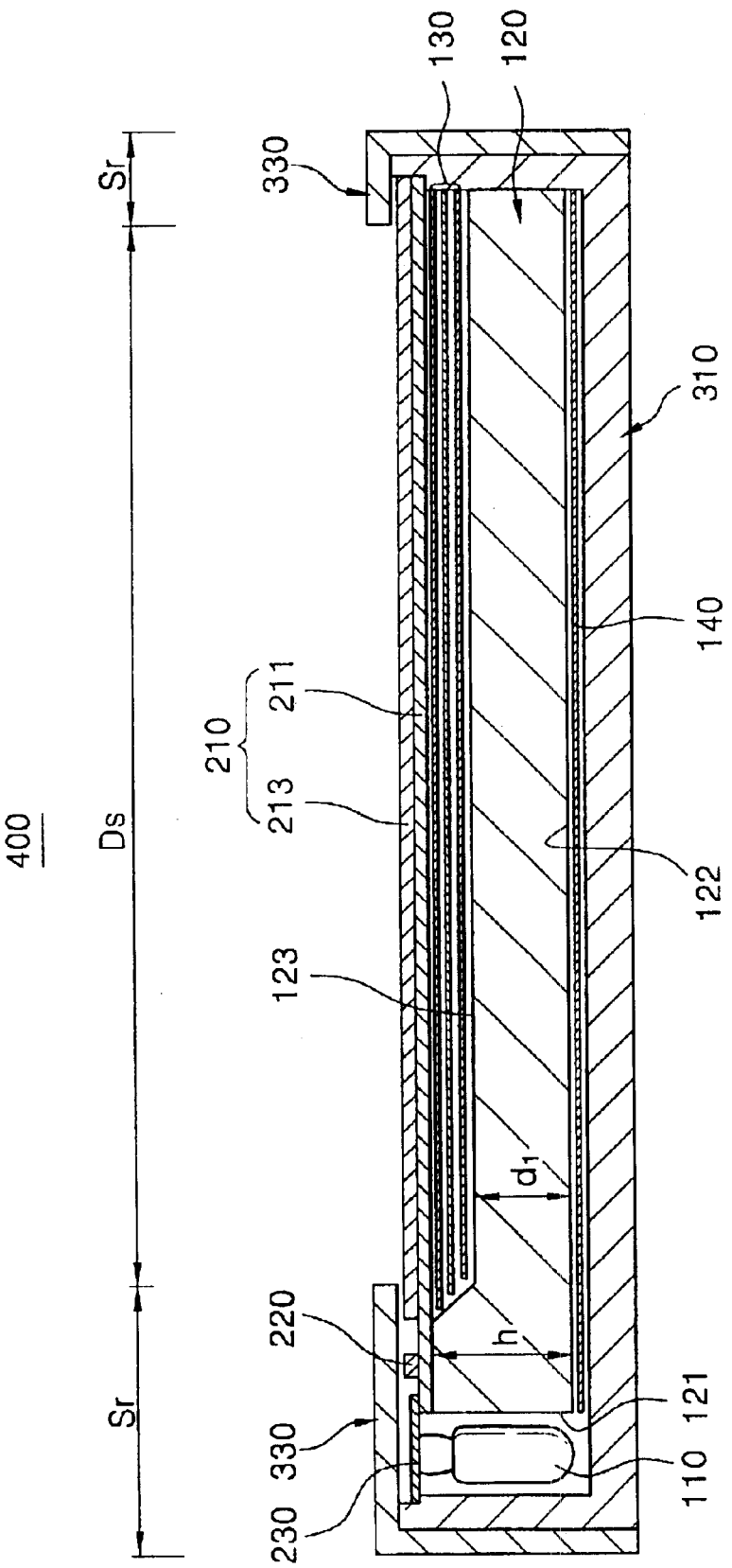
FIG. 7 is a cross-sectional view taken along the line B–B' showing the LCD apparatus shown in FIG. 6.

FIG. 6 is an exploded perspective view showing an LCD apparatus according to an exemplary embodiment of the present invention. FIG. 7 is a cross-sectional view taken along the line B–B' showing the LCD apparatus shown in FIG. 6.

Referring to FIGS. 6 and 7, an LCD apparatus 400 includes the backlight assembly 100 for generating the light, a display unit 200 for receiving the light and displaying an image, a mold frame 310 for sequentially receiving the backlight assembly 100 and the display unit 200 and a top chassis 330 combined with the mold frame 310 so as to fix the display unit 200 to the mold frame 310.

The backlight assembly 100 includes the light source for generating the light and the light guide plate 120 for guiding the light so as to emit the light in the predetermined direction. The light source 110 includes the point light source, for example, such as the plurality of light-emitting diodes.

The light guide plate 120 includes the incident surface 121 that receives the light emitted from the light source 110 and is disposed adjacent to the light source 110, the reflecting surface 122 that reflects the light incident through the incident surface 121 and extends from the first end 121a of the incident surface 121 (see FIG. 2) and the emitting surface 123 that emits the light incident through the incident surface 121 and faces the reflecting surface 122. The height "h" of the incident surface 121 is greater than the first linear distance d1 between the reflecting surface 122 and the emitting surface 123.

The light guide plate 120 further includes the guide portion 124 that guides the light incident through the incident surface 121 to the emitting surface 123. Particularly, the guide portion 124 includes the first surface 124a extended form the second end 121b of the incident surface 121 and the second surface 124b extended from the first surface 124a. The first surface 124a is parallel to the reflecting surface 122 and the second surface 124b connects the first surface 124a to the emitting surface 123.

The second linear distance d2 between the first surface 124a and the reflecting surface 122 is greater than the first linear distance d1 between the reflecting surface 122 and the emitting surface 123 and same to the height "h" of the incident surface 121. Also, the second surface 124b is inclined from the first surface 124a toward the emitting surface 123 in the predetermined angle α.

The plurality of optical sheets 130 is disposed on the emitting surface 123 so as to improving optical properties, for example, such as brightness uniformity, visual angle, etc., of the light emitted from the emitting surface 123. The plurality of optical sheets 130 has a size corresponding to that of the emitting surface 123, so that the plurality of optical sheets 130 is disposed only on the emitting surface 123.

In the exemplary embodiment of the present invention, the plurality of optical sheets 130 includes a diffusion sheet 131 for improving the brightness uniformity of the light emitted from the emitting surface 123, a prism sheet 132 for increasing front brightness of the light diffused by the diffusion sheet and a protection sheet 133 for protecting the shape of the prism sheet 132.

The first thickness t1 of the plurality of optical sheets 130 is equal to or smaller than the third linear thickness d3 between the first surface 124a and the emitting surface 123. Thus, although the plurality of optical sheets 130 is disposed on the emitting surface 123, the second thickness t2 of the backlight assembly 100 does not increase by the first thickness t1 of the plurality of optical sheets 130.

The reflecting plate 140 is disposed under the reflecting surface 122. The reflecting plate 140 reflects the light leaked from the reflecting surface 122 to the light guide plate 120 so as to improving the light efficiency of the backlight assembly 100.

Although not shown in FIGS. 6 and 7, in order to prevent the leakage of the light supplied to the guide portion 124 through the incident surface 121, the light guide plate 120 may further include a reflecting film (not shown) disposed on the guide portion 124. That is, the reflecting film disposed on the guide portion 124 reflects the light to the light guide plate 120, thereby improving the light efficiency of the backlight assembly 100 and the display quality of the LCD apparatus 400

In addition, the light guide plate 120 may further include a printed pattern (not shown) formed on the incident surface 121 and the reflecting surface 122. When the printed pattern is formed on the incident surface 121, the light emitted from the light source 110 and incident through the incident surface 121 may be guided to the emitting surface 123 by means of the printed pattern. Also, when the printed pattern is formed on the reflecting surface 122, the light incident through the incident surface 121 may be guided to the emitting surface 123 without leaking the light. Thus, the light efficiency of the backlight assembly 100 can be improved.

The display unit 200 includes an LCD panel 210 for displaying an image, a driving IC 220 for driving the LCD panel 210 and an FPC (Flexible Printed Circuit Board) 230 for transmitting a signal provided from an exterior to the driving IC 220.

The LCD panel 210 includes a first substrate 211, a second substrate 213 facing the first substrate 211 and a liquid crystal layer (not shown) interposed between the first and second substrates 211 and 213. The first substrate 211 includes a plurality of pixels in a matrix configuration and the plurality of pixels includes a TFT (Thin Film Transistor) and a pixel electrode connected to the TFT.

The second substrate 213 includes a common electrode facing the pixel electrode. Accordingly, the liquid crystal layer is arranged in response to an electric field generated between the common electrode and the pixel electrode to control a light transmittance of the liquid crystal layer.

As shown in FIG. 7, the LCD panel 210 includes a display area Ds on which the image is displayed and a peripheral area Sr disposed adjacent to the display area Ds. The size of the light emitting surface 123 is larger than that of the display area Ds of the LCD panel 210. If the size of the light emitting surface 123 is equal to or smaller than the size of the display area Ds, the light emitted from the backlight assembly 100 may not be provided to the whole surface of the display area Ds due to assembly errors of the LCD panel 210. Thus, the display quality of the LCD apparatus 400 can be improved by allowing the light emitting surface 123 to have the size larger than the size of the display area Ds of the LCD panel 210.

The driving IC 220 is disposed on the peripheral area Sr. The driving IC 220 includes an input terminal (not shown) electrically connected to the first substrate 211 and an output terminal (not shown) electrically connected to the FPC 230. Therefore, the driving IC 220 receives signals through the FPC from the exterior and provides the signals to the first and second substrates 211 and 213.

The plurality of light-emitting diodes 110 is attached to a rear surface of the FPC 230 and disposed adjacent to the incident surface 121 of the light guide plate 120. That is, the plurality of light-emitting diodes 110 is positioned at the peripheral area Sr and has a height equal to or lower than the height "h" of the incident surface 121 of the light guide plate 120.

Particularly, the plurality of light-emitting diodes 110 is operated in response to the signals applied from the exterior through the FPC 230 to generate the light.

The mold frame 310 includes a bottom surface 311 and first to fourth sidewalls 312, 313, 314 and 315 extended from the bottom surface 311 to provide a receiving space. The reflecting plate 140, the light guide plate 120 and the optical sheets 130 are sequentially received in the receiving space of the mold frame 310. The optical sheets 130 are disposed on the emitting surface 123 of the light guide plate 120 except the guide portion 124. Thus, although the optical sheets 130 are disposed on the emitting surface 123, an entire thickness, that is, a second thickness t2 of the backlight assembly 100 does not increase by the first thickness t1 of the optical sheets 130.

The LCD panel 210 is disposed on the first surface 124a and the optical sheets 130. The display area Ds and the peripheral area Sr of the LCD panel 210 are corresponding to the emitting surface 123 and the guide portion 124 of the light guide plate 120, respectively.

The FPC 230 is disposed corresponding to the incident surface 121 of the light guide plate 120 and the plurality of light-emitting diodes 110 attached to the rear surface of the FPC 230 is disposed adjacent to the incident surface 121. The light emitted from the plurality of light-emitting diodes 110 is supplied to the light guide plate 120 through the incident surface 121.

The top chassis 330 is combined with the mold frame 310 to partially cover the LCD panel 210. Particularly, the top chassis 330 includes an upper surface 331, that is partially opened so as to expose the display area Ds of the LCD panel 210, and fifth to eighth sidewalls 332, 333, 334 and 335 extended from the upper surface 331.

When the top chassis 330 is combined with the mold frame 310, the upper surface of the top chassis 330 covers the peripheral area Sr of the LCD panel 210 and the fifth to eight sidewalls 332, 333, 334 and 335 are combined with the first to fourth sidewalls 312, 313, 314 and 315 of the mold frame 310, respectively, thereby completing the LCD apparatus 400.

Figure 8:
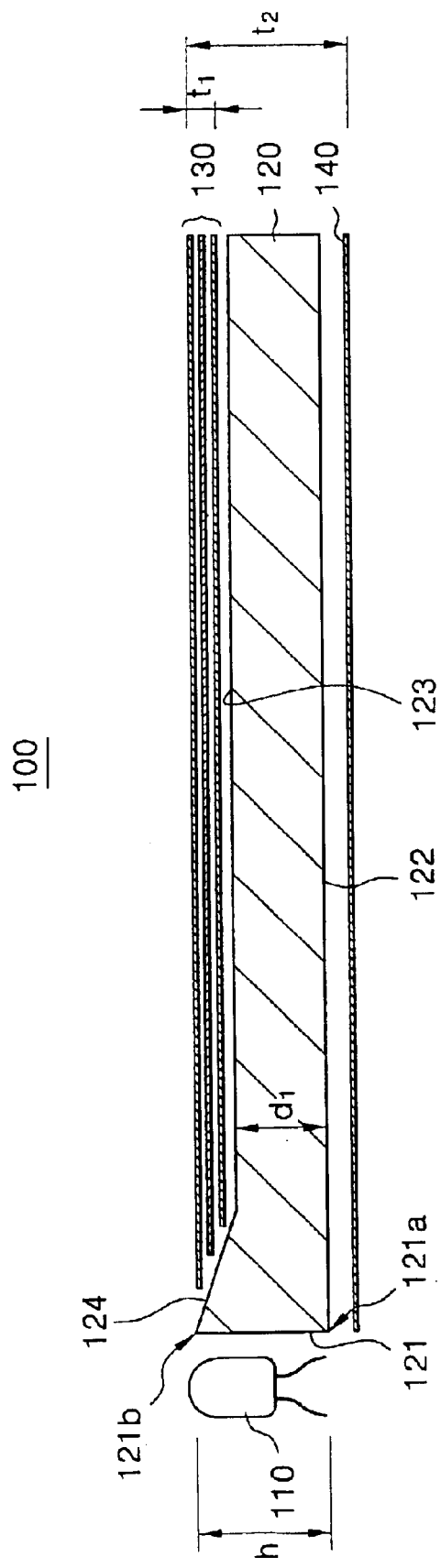
FIG. 8 is a cross-sectional view showing a backlight assembly according to another exemplary embodiment of the present invention.

FIG. 8 is a cross-sectional view showing a backlight assembly according to another exemplary embodiment of the present invention. In the backlight assembly shown in FIG. 8, parts having a same structure as the backlight assembly shown in FIG. 3 will not be described in detail and will be allowed to have a same reference numeral as the backlight assembly shown in FIG. 3.

Referring to FIG. 8, a light guide plate 120 includes an incident surface 121 that receives the light emitted from the light source 110, a reflecting surface 122 that reflects the light incident through the incident surface 121 and extends from a first end 121a of the incident surface 121 and an emitting surface 123 that emits the light incident through the incident surface 121 and reflected from the reflecting surface 122. The emitting surface 123 is parallel to the reflecting surface 122.

The incident surface 121 has a height "h" and the emitting surface 123 is separated from the reflecting surface 122 by a first linear distance d1 smaller than the height "h". Thus, a guide surface 124 is inclined with respect to the reflecting surface 122 so as to connect a second end 121b of the incident surface 121 to the emitting surface 123. That is, a linear distance between the reflecting surface 122 and the guide surface 124 is shortened according as the guide surface 124 is separated apart from the incident surface 121.

As aforementioned above, a plurality of optical sheets 130 is disposed on the emitting surface 123. The plurality of optical sheets 130 has a size corresponding to that of the emitting surface 123 and is disposed only on the emitting surface 123.

The plurality of optical sheets 130 has a first thickness t1, that is equal to or smaller than a height that subtracts a first linear distance d1 from the height "h" of the incident surface 121. Accordingly, although the plurality of optical sheets 130 is disposed on the emitting surface 123, an entire thickness, that is, a second thickness t2 of the backlight assembly 100 does not increase by the first thickness t1 of the plurality of optical sheets 130.

A reflecting plate 140, which is having a size corresponding to that of the reflecting surface 122, is disposed under the reflecting surface 122. The reflecting plate 140 reflects the light leaked from the reflecting surface 122 to the light guide plate 120 so as to improving the light efficiency of the backlight assembly 100.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A backlight assembly comprising:
a light source configured to generate light; and a light guide plate including;
  an incident surface having a first height, configured to receive the light;
  a reflecting surface extended from a first end of the incident surface, configured to reflect the light incident through the incident surface;
  an emitting surface facing the reflecting surface and being separated from the reflecting surface by a second height smaller than the first height, configured to emit the incident light and the reflected light; and
  a guide portion having a first surface extended from a second end of the incident surface and a second surface being inclined from the first surface and configured to connect the first surface to the emitting surface,
wherein the emitting surface and the second surface of the guide portion define a space in which an optical sheet is received, and a liquid crystal display panel is disposed on both the first surface of the guide portion and the optical sheet.

2. The backlight assembly of claim 1, wherein the first height is greater than a linear distance between the reflecting surface and the emitting surface.

3. The backlight assembly of claim 1, wherein the light source is a point light source.

4. The backlight assembly of claim 1, wherein the guide portion is configured to guide the incident light through the incident surface to the emitting surface.

5. The backlight assembly of claim 1, wherein the space has a height that subtracts a linear distance between the emitting surface and the reflecting surface from the first height of the incident surface.

6. The backlight assembly of claim 1, wherein an interior angle between the first surface and the second surface is larger than 90 degrees and smaller than 180 degrees.

7. The backlight assembly of claim 1, wherein a distance between the second surface of the guide portion and the reflecting surface is shortened according as the second surface is separated apart from the incident surface.

8. The backlight assembly of claim 1, wherein the optical sheet is configured to improve optical properties of the light emitted from the emitting surface of the light guide plate.

9. The backlight assembly of claim 5, wherein a height of the optical sheet is equal to the height of the space.

10. The backlight assembly of claim 5, wherein the optical sheet has a height smaller than the height of the space.

11. The backlight assembly of claim 1, wherein the first surface is substantially parallel with the emitting surface.

12. The backlight assembly of claim 1, wherein the liquid crystal display panel is an outside of the space.

13. A liquid crystal display apparatus comprising:
  a light source configured to generate light;
  a light guide plate including:
    an incident surface having a first height, configured to receive the light;
    a reflecting surface extended from a first end of the incident surface, configured to reflect the light incident through the incident surface;
    an emitting surface facing the reflecting surface and being separated from the reflecting surface by a second height smaller than the first height, configured to emit the incident light and the reflected light; and
    a guide portion having a first surface extended from the second end of the incident surface and a second surface being inclined from the first surface and configured to connect the first surface to the emitting surface;
  an optical sheet received in a space defined by the emitting surface and the second surface of the guide portion; and
  a liquid crystal display panel having a display area configured to display an image in response to the light emitted from the light guide plate and a peripheral area disposed adjacent to the display area, the liquid crystal display panel being disposed on both the first surface of the guide portion and the optical sheet.

14. The liquid crystal display apparatus of claim 13, wherein the guide portion is positioned at an area corresponding to the peripheral area so as to guide the incident light through the incident surface to the emitting surface.

15. The liquid crystal display apparatus of claim 14, further comprising a printed circuit board disposed on the peripheral area so as to provide a driving signal to the liquid crystal display panel.

16. The liquid crystal display apparatus of claim 15, wherein the printed circuit board is extended to an upper portion of the light source by way of the guide portion and applies a power voltage to the light source to drive the light source.

17. The liquid crystal display apparatus of claim 13, wherein the light source is positioned at the peripheral area and has a height lower than the first height.

18. A liquid crystal display apparatus comprising:
  slight source configured to generate light;
  an optical sheet configured to improve optical properties of the light and emitting the light;
  a light guide plate configured to receive the light emitted from the light source, to supply the light to the optical sheet, and to receive the optical sheet; and
  a liquid crystal display panel having a display area configured to display an image in response to the light emitted from the optical sheet and a peripheral area disposed adjacent to the display area,
wherein the light guide plate includes a recessed portion and a flat portion, the recessed portion receiving the optical sheet; and
wherein the liquid crystal display panel is disposed on both the flat portion of the light guide plate and the optical sheet.

19. The liquid crystal display apparatus of claim 18, wherein the light guide plate comprises:
  an incident surface having a first height, configured to receive the light emitted from the light source;
  a reflecting surface extended from a first end of the incident surface, configured to reflect the light incident through the incident surface;
  an emitting surface facing the reflecting surface and being separated from the reflecting surface by a second height smaller than the first height, configured to emit the light incident through the incident surface and the light reflected from the reflecting surface; and
  a guide portion having a first surface extended from a second end of the incident surface and a second surface inclined from the first surface and connected to the emitting surface, the first surface of the guide portion defining the flat portion of the light guide plate,
wherein the second surface of the guide portion and the emitting surface define the recessed portion of the light guide plate in which the optical sheet is received, and the liquid crystal display panel is disposed on the second surface of the guide portion and the optical sheet.

20. The liquid crystal display apparatus of claim 19, wherein the guide portion guides the light incident through the incident surface to the reflecting surface and the emitting surface.

21. The liquid crystal display apparatus of claim 19, wherein the light source is positioned at the peripheral area and has a height lower than the first height.

22. The liquid crystal display apparatus of claim 13, wherein the optical sheet has a height equal to the height of the space.

23. The liquid crystal display apparatus of claim 19, wherein the space has a height that subtracts a linear distance between the emitting surface and the reflecting surface from the first height of the incident surface.

24. The liquid crystal display apparatus of claim 23, wherein the optical sheet has a height equal to the height of the space.

25. The liquid crystal display apparatus of claim 13, wherein the first surface is substantially parallel with the emitting surface.

26. The liquid crystal display apparatus of claim 25, wherein the liquid crystal display panel is directly on the first surface and the optical sheet.

27. The liquid crystal display apparatus of claim 25, wherein the liquid crystal display panel makes contact with the first surface and the optical sheet.

28. The liquid crystal display apparatus of claim 13, wherein the liquid crystal display panel is an outside of the space.

29. The liquid crystal display apparatus of claim 18, wherein the liquid crystal display panel is an outside of the recessed portion of the liquid guide plate.

30. The liquid crystal display apparatus of claim 13, further comprising:

a mold frame to receive the light guide plate, the optical sheet, and the liquid crystal display panel; and a top chassis to combine with the mold frame, wherein the peripheral area of the liquid crystal display panel is disposed between the top chassis and the first surface of the guide portion.

31. The liquid crystal display apparatus of claim 18, further comprising:

a mold frame to receive the light guide plate, the optical sheet, and the liquid crystal display panel; and a top chassis to combine with the mold frame, wherein the peripheral area of the liquid crystal display panel is disposed between the top chassis and the flat portion of the light guide plate.

* * * * *